Inventor:
Herbert Holzwarth, &
Walter Arens.
By [signature] Atty.

April 4, 1961 H. HOLZWARTH ET AL 2,978,544

APPARATUS FOR SIMULTANEOUSLY TRANSMITTING A PLURALITY OF MESSAGES

Filed May 20, 1955 2 Sheets-Sheet 2

Inventors.
Herbert Holzwarth, &
Walter Arens.
By. [signature] Atty.

United States Patent Office 2,978,544

Patented Apr. 4, 1961

2,978,544

APPARATUS FOR SIMULTANEOUSLY TRANSMITTING A PLURALITY OF MESSAGES

Herbert Holzwarth and Walter Arens, Munich, Germany, assignors to Siemens & Halske Aktiengesellschaft, Munich and Berlin, Germany, a corporation of Germany Filed May 20, 1955, Ser. No. 509,994

Public Law 619, Aug. 23, 1954
Patent expires Oct. 1, 1968

5 Claims. (Cl. 179—15)

Figure 1:
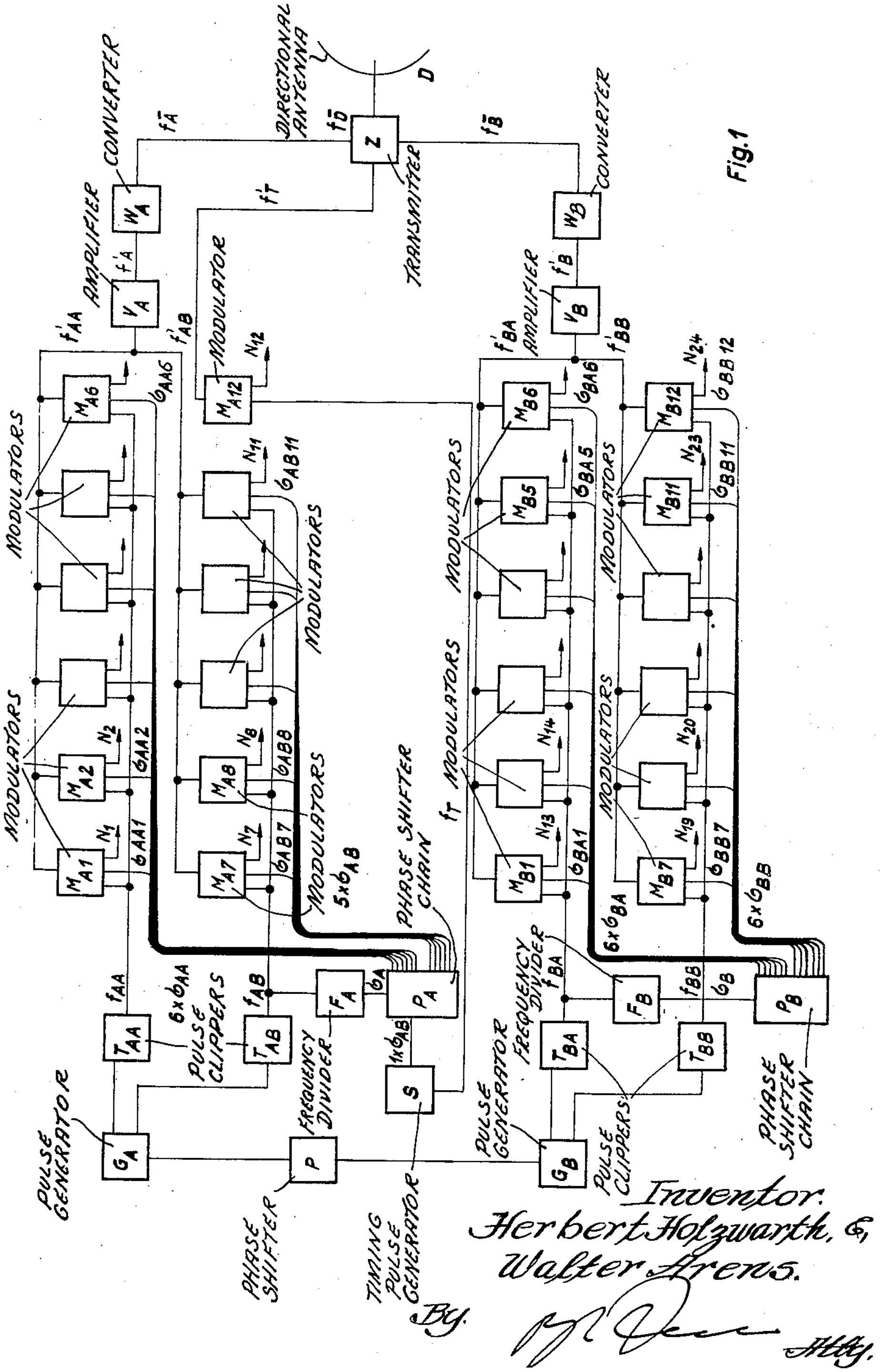

This invention is concerned with apparatus for simultaneously transmitting a plurality of messages.

For better utilization of transmission lines, systems have been used for a long time which permit simultaneous loading of one line with several messages. In general, high-frequency carrier voltages have been used for this purpose, having frequencies spaced by a predetermined amount depending upon the frequency range of the messages to be transmitted. In the case of telephone conversations, the frequency range amounts to about 3500–4000 cycles.

Cables or overhead lines are now being replaced by directional wireless connections. Waves of very high frequency (decimeter and centimer waves) have given good results on account of their adaptability to directional operation. It is possible in these methods to operate without the very complicated and expensive wide band cables which are otherwise required for the transmission of many messages.

The transmission of several messages over a line or rather to say over a directional connection, may also be carried out such that the different messages are not allotted to different adjacently placed and simultaneously radiated frequency bands, but alternately distributed upon successively occurring surgelike radiations (high-frequency pulses).

In a similar manner as the commonly used amplitude modulation is being replaced in modern wireless operation, by frequency modulation, due to reduced interference vulnerability of the latter, the more interference-free pulse phase modulation is being preferred over amplitude pulse modulation, for the simultaneous transmission of several messages, the phase modulation of pulses having in addition the virtue of allowing the transmitter to oscillate with constant frequency and constant amplitude during the times determined by the pulses. The difficulties of modulation of ultra high frequencies are in this manner avoided.

The pulse phase modulation shifts the individual pulses depending upon the degree of modulation, more or less with respect to their normal position in unmodulated condition and with respect to their neighboring pulses. Every time affect upon the pulse repetition frequency shall in this connection be referred to as pulse phase modulation, regardless of whether it may in an individual case be a frequency modulation or a true phase modulation or the like.

Suitable means are provided for taking care to modulate a regular pulse series, for example, each 24th pulse with one and the same message, while the intermediate 23 pulses serve alternately for 23 other message channels. In order to be able to distribute the individual messages, with pulse phase modulation, on which the instant of transmission and therewith the mutual spacing of the pulses fluctuates, at the receiver end to the corresponding channels, such distribution must be effected rigidly in-phase and synchronous with the operations of the transmitter. For this purpose, one pulse must always be taken from a large number of pulses, which is in suitable manner marked as a timing pulse appearing always in identical phase position. For instance, adhering to the above example, each 24th pulse may be used as a rigid in-phase pulse, so that the position of the other 23 pulses is in the receiver determined relative to this pulse which is decisive for the distribution and demodulation. In order to use the timing pulse nevertheless for the transmission of a message, it may be suitably provided with a modulation which permits at least transmission of somewhat reduced quality, for example, useful for internal exchange calls.

The production of phase modulation requires relatively complicated operations which are in the prior known methods effected either with the use of very expensive electron radiation tubes (switching tubes) or with the aid of a very great number of tubes of customary construction. The demodulation must be achieved in similar ways and manner as the modulation. The transmitter and receiver in installations for pulse phase modulation require for these reasons a considerable expenditure in tubes which reduces to a noticeable degree the greater reliability of operation on account of the probability of tube failure.

The apparatus according to the invention is in comparison with this situation distinguished by a very considerable reduction of expenditures especially so far as tubes are concerned. The invention provides for impressing the messages first upon pulses rigidly locked in phase, as amplitude modulation, and converts the resulting amplitude modulated pulses into phase modulated pulses.

It has been found that this seemingly complicated modulation and demodulation procedure, requiring instead of one, two separate steps (production of an amplitude-modulated pulse series and conversion thereof into a phase modulated series) can in fact be carried out with simpler means than the previously known seemingly simpler operation.

It is in this way particularly possible to carry out amplification of the amplitude-modulated pulses in a single amplifier for all channels, and it is further possible to carry out the conversion of the amplitude-modulated pulses into phase-modulated pulses with very little expenditure for all channels in common. Even applied to an installation with relatively few channels, it is possible to operate in the trransmitter with a total of two normal amplifier tubes per channel, one of said tubes being the modulation tube which is at any rate required for each channel. The number of tubes required in the receiver is similarly low.

The individual operations may thereby be carried out with relatively simple switching means available to anyone experienced in the art. Thus, the distribution of the individual channels with respect to the diverse pulses may be easily carried out with amplitude modulation in a single tube, in accordance with a known extraction method for individual pulses and the amplification merely requires a wide band amplifier of known construction. For the conversion of the amplitude-modulated pulses into phase-modulated pulses, there may be used a circuit for storing the corresponding pulse amplitudes and for determining upon discharge of the storage means its voltage at a predetermined fixed value, as a time criterion for the release of a new phase-modulated pulse.

The timing pulse is in this manner likewise produced very simply. In the simplest case, it is only necessary to exclude from the conversion to phase modulation merely one of the amplitude modulated pulses and to transmit it as a timing pulse. It is in such case immaterial which of the modulated pulses from the series of pulses modulated with diverse messages, is used for this purpose. Even the amplification of this pulse may be carried out together with the amplification of the other pulses in the same amplifier.

In accordance with another feature of the invention, the production of the pulses and their modulation may be advantageously effected in groups in different arrangements, in order to obtain in the devices therefore required greater mutual time spacing of the individual pulses and therewith a better possibility for clear-cut separation and prevention of mutual interference. Several such groups may then be interleaved ahead of transmission, in such a manner, that the pulses of one group fall as to time always between the pulses of the other groups.

It is in this manner possible to carry out the transmission by means of high-frequency oscillation, with an extraordinary pulse series density, that is, with very many channels, without posing for the equipment for pulse producing, modulating, demodulating, etc., any particularly difficult requirements.

There is needed for this purpose, above all, a good mutual phase rigidity of the individual groups of amplitude modulated pulses (prior to phase-modulation) and rigidity thereof with respect to the common timing pulse. This may be advantageously accomplished by common generation of the pulses for several groups in the same generator, which pulses are thereafter separated by separation stages, modulated in different groups, and suitably united again ahead of amplification thereof.

The arrangement may however be so as to carry out the pulse generation in separate generators and to effect the interleaving into other groups after amplification and conversion. In such a case, the generators must be kept accurately in step by a common control frequency.

There are, finally combined arrangements possible, making use of both embodiments in order to achieve a dense loading of the transmission path.

The above indicated and further features of the invention will appear from the following description which will be rendered below with reference to the accompanying diagrammatic drawings. In these drawings Fig. 1 shows in block diagram manner, to illustrate the principle involved, an arrangement for practicing the method of the invention; the illustrated embodiment being specialized to a far-reaching extent beyond the simplest possible form; and Fig. 2 indicates some of the voltages occurring in the operation of the arrangement according to Fig. 1.

Referring now to Fig. 1, each of the two generators $G_A$ and $G_B$, connected by a phase shifter P, produces two pulse series of identical frequency. The two pulse series produced by one of the generators are laterally mutually shifted, such, that the pulses of one series lie exactly midway of the pulses of the other series. The generator $G_B$ is by the phase shifter P held in a phase position relative to the generator $G_A$ such, that the two pulse series produced thereby, which are mutually similarly shifted as those produced by the generator $G_A$, occur midway of the gaps between the pulses of the last-named generator.

From the generator $G_A$, the two pulse series are conducted to two separation stages $T_{AA}$ and $T_{AB}$, and those from the generator $G_B$ are conducted to two separation stages $T_{BA}$ and $T_{BB}$ in which the pulses of opposite polarity lying respectively between the pulses required for further evaluation are cut off. The pulse series $f_{AA}$ thus purified at $T_{AA}$ is thereupon conducted to the modulators $M_{A1}$ to $M_{A6}$; the other pulse series $f_{AB}$, $f_{BA}$ and $f_{BB}$ being respectively conducted to modulators $M_{A7}$—$M_{A11}$, $M_{B1}$ to $M_{B6}$ and $M_{B7}$ to $M_{B12}$. The pulse series $f_{AB}$ is conducted to in a frequency divider $F_A$ to produce a sinusoidal voltage $\sigma_A$ while the pulse series $f_{BA}$ is conducted to a frequency divider $F_B$ to produce a sinusoidal voltage $\sigma_B$, such sinusoidal voltages being respectively conducted to phase shifter chains $P_A$ and $P_B$.

From each of these phase shifter chains there are obtained twelve sinusoidal voltages, in two groups; for example, from the phase shifter $P_A$, six voltages $\sigma_{AA}$ and $\sigma_{BA}$. The six voltages in a group are always mutually shifted by 60° and the voltages of one group with respect to the other are shifted by 30°. In the branch B of the arrangement occur the same operations, except for the difference, that the voltages $\sigma_{BA}$ and $\sigma_{BB}$ are shifted by 15° with respect to the voltages of the branch A, because they are derived from the pulse series $f_{BA}$ which is shifted relative to the pulse series $f_{AB}$ (whereby $f_{BA}$ could as well be $f_{BB}$). Of these voltages, one is always conducted to a modulator M; for example, the six voltages $\sigma_{AA}$ are distributed to the modulators $M_{A1}$ to $M_{A6}$, etc.

The last voltage $\sigma_{AB}$ makes an exception; it is used in a timing pulse generator S for producing a timing pulse $f_T$ which is prolonged as compared with the duration of the pulses of the remaining pulse series. This prolonged timing pulse is modulated in the modulator $M_{A12}$, by a message voltage $N_{12}$ and is fed, for example, as a duration-modulated pulse with a phase locked flank to the transmitter Z.

The two frequency dividers $F_A$ and $F_B$ operate such that they divide the pulse repetition frequencies fed thereinto, in a ratio of 6 : 1. In the modulator $M_{A1}$ each sixth pulse which happens to coincide with the crest of the voltage $\sigma_{AA}$ will accordingly produce a particularly high voltage, due to the superimposing of the pulse repetition frequency $f_{AA}$ with the first of the six voltages $\sigma_{AA}$, which particularly high voltage is alone adapted to open the modulator, assuming suitable dimensioning of the grid bias of the modulator tubes, while the remaining five pulses of the pulse repetition meet lower values of the voltage $\sigma_{AA1}$ and therefore cannot pass the modulator tube.

The voltage $\sigma_{AA2}$ allotted to the modulator $M_{A2}$ is accordingly as compared with the voltage for the modulator $M_{A1}$, shifted by 60°, that is by 1/6 of the frequency $\sigma_{AA}$ or by one cycle of the pulse repetition frequency. The next pulse of the pulse repetition $f_{AA}$ will therefore occur in the modulator $M_{A2}$ at the crest value of the voltage $\sigma_{AA2}$ and will open the modulator, while the first and the four last pulses of the pulse repetition $f_{AA}$ are suppressed.

In the further modulators of the group AA occurs the same always with respect to another pulse of the pulse repetition $f_{AA}$, and in the modulators of the group AB with respect to the pulses of the pulse repetition $f_{AB}$. Corresponding operations occur in the groups BA and BB.

To each of the twenty-four modulators is conducted a modulation voltage $N_1$ to $N_{24}$ which carries the message to be transmitted.

From the modulators $M_{A1}$ to $M_{A6}$ is taken off an amplitude modulated pulse series $f_{AA}$, of which each 6th impulse is modulated by one and the same message. Such pulse series is combined with the pulse series $f'_{AB}$ coming from the modulators $M_{A7}$ to $M_{A11}$, to form a pulse series $f'_A$ of double the pulse series frequency, which is amplified in the amplifier $V_A$ and thereupon converted into a phase modulated series $f_A$ in the converter $W_A$. The position of the respective 12th pulse of this series remains for the time being vacant; the pulse series $f'_B$, coming from the modulators $M_{B1}$ to $M_{B12}$, combined of $f'_{BA}$ and $f'_{BB}$, which is amplified in the amplifier $V_B$ and converted in the converter $W_B$ into a phase modulated series $f_B$, is however entirely complete.

The transmitter Z is alternately scanned by a pulse of the series $\bar{f_A}$ and a pulse of the series $\bar{f_B}$, the 12th place first left vacant in the succession $\bar{f_A}$ being taken by the phase-rigid, length-modulated timing pulse $f'_T$. The pulse series $f_D$ thus produced is transmitted over the directional antenna D. The series frequency $\bar{f_D}$ is four times that of the pulse repetition rate. The $f_{AA}$ fundamental frequency of the transmitter Z has no relation to the repetition frequency; considering the good directional effect of very high frequencies, it may be on the order of several thousand megacycles.

Figure 2:
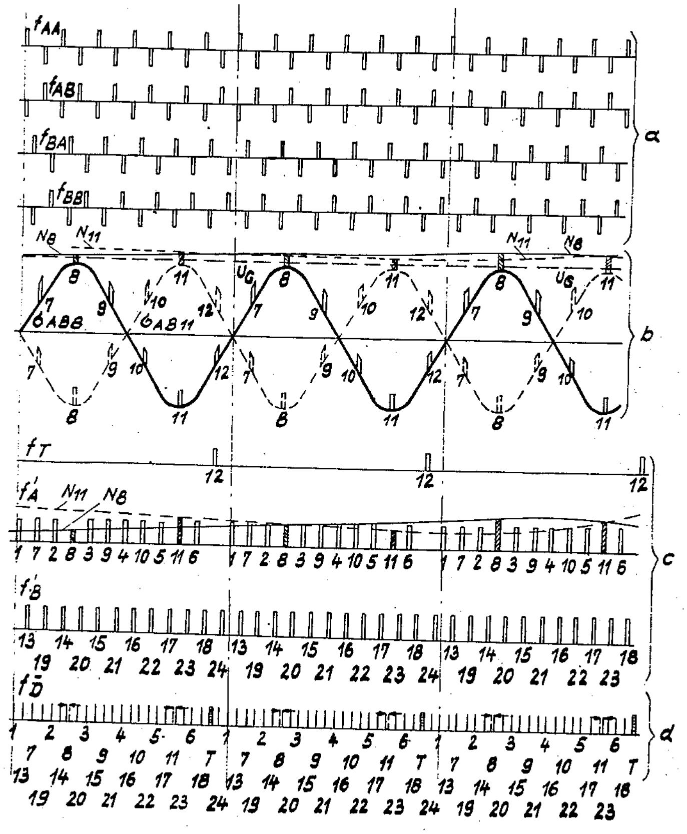

Referring now to Fig. 2, the voltage curves shown with respect to diverse points of the arrangement of Fig. 1, are placed one underneath the other so that simultaneous operations appear in vertical alignment.

At 2*a* are indicated the four pulse series delivered by the two generators $G_A$ and $G_B$, as they may be visualized ahead of the separation or cut-off stages $T_{AA}$, $T_{AB}$, $T_{BA}$ and $T_{BB}$. The cutoff stages always clip or cut off the impulse directed downwardly, so that only the impulses remain which are directed upwardly and indicated by $f_{AA}$, $f_{AB}$, $f_{BA}$ and $f_{BB}$.

At 2*b* are indicated the modulating operations for two modulators of the group AB. At the modulator $M_{A8}$ will be superimposed the voltage $\sigma_{AB8}$, the impulse series $f_{AB}$ and the message voltage $N_8$. Reference $U_G$ indicates the blocking voltage of the modulator. Only the pulses of the sequence $f_{AB}$ coinciding with the crest voltage of $\sigma_{AB8}$ will exceed this blocking voltage and open the modulator. They are thereby amplitude modulated by the low frequency message voltage $N_8$. At the modulator $M_{11}$ happens the same with reference to the voltages $\sigma_{AB11}$, $f_{AB}$ and $N_{11}$, which are indicated in dotted lines.

At 2*c* are shown the pulses of the sequences $f'_A$ and $f'_B$, which are amplitude modulated, and also the timing pulse $f$, after amplification thereof in the amplifiers $V_A$ and $V_B$. It is for simplicity of representation assumed that all pulses are unmodulated. Only the pulses 8 and 11 of the series $f_{AB}$ (also shown modulated in 2*b* of Fig. 2 are represented as having been modulated by $N_8$ and $N_{11}$.

Section *d* of Fig. 2 finally shows the pulse scheme of the sequence $f_{\overline{D}}$ which is actually transmitted by the transmitter. For convenience of representation, a simplification has again been made, by showing unmodulated all impulses similarly as shown in section *c* of Fig. 2 while showing the impulses 8 and 11 in modulated condition. The position assumed in the scheme by these two impulses when they are unmodulated, is indicated in dotted lines.

Changes may be made within the scope and spirit of the sppended claims.

We claim:

1. Apparatus for simultaneously transmitting a plurality of messages, comprising generator means for producing a series of phase-locked pulses, means for producing from said phase-locked pulses a plurality of phase-shifted sinusoidal waves, two groups of modulators each group comprising a plurality of modulators, means for conducting to each of said modulators frequencies representing respectively individual messages to be transmitted, means for also conducting to each of said modulators said phase-locked pulses and one of said sinusoidal waves so as to cause each modulator to become operative to amplitude modulate with the message frequencies conducted thereto only those of the phase-locked pulses which coincide with crests of the respective sinusoidal waves, common amplifier means for amplifying the amplitude modulated pulses coming from all of said modulators, a common converter for converting all of the amplitude modulated pulses into phase modulated pulses, and means for transmitting said phase modulated pulses.

2. Apparatus for simultaneously transmitting a plurality of messages, comprising a first and a second generator each for producing two series of pulses locked in phase, means for respectively producing from one of said pulse series a plurality of sinusoidal mutually phase-shifted waves, two groups of modulators for each generator each group comprising a plurality of modulators, means for conducting to each modulator frequencies representing respectively individual messages to be transmitted, means for respectively conducting one of said series of phase-locked pulses and a sinusoidal wave to each modulator in one of said groups, and means for conducting the other one of said series of pulses and a sinusoidal wave to each modulator in the other group, each modulator becoming operative to amplitude modulate with the message frequencies conducted thereto only phase-locked pulses which coincide with the crests of the corresponding sinusoidal wave, means common to each two groups of modulators for converting the amplitude modulated pulses coming therefrom into phase modulated pulses, and means for transmitting said phase modulated pulses.

3. Apparatus according to claim 2, comprising means for producing a time-prolonged timing pulse from the phase-locked pulses of one of said series of pulses produced by one of said generators, means for modulating said timing pulse by pulse duration modulation with frequencies representing a message to be transmitted, and means for transmitting said pulse duration modulated timing pulses together with said phase modulated pulses.

4. Apparatus according to claim 2, comprising a phase shifter for holding one of said generators in phase position relative to the other generator such that the pulses of the pulse series produced by one of said generators lie midway of the pulses produced by the other generator.

5. Apparatus according to claim 2, comprising a phase shifter for holding one of said generators in phase position relative to the other generator such that the pulses of the pulse series produced by one of said generators lie midway of the pulses produced by the other generator, means for producing time-prolonged timing pulses from the phase-locked pulses of one of said series of pulses produced by one of said generators, means for modulating said timing pulses by pulse-duration modulation with frequencies representing a message to be transmitted, and means for transmitting said pulse duration modulated timing pulses together with said phase modulated pulses.

References Cited in the file of this patent

UNITED STATES PATENTS

| | | |
|---|---|---|
| 2,408,077 | Labin | Sept. 24, 1946 |
| 2,491,810 | Guanella | Dec. 20, 1949 |
| 2,498,678 | Grieg | Feb. 28, 1950 |
| 2,547,001 | Grieg | Apr. 3, 1951 |
| 2,563,406 | Goldsmith | Aug. 7. 1951 |
| 2,567,203 | Golay | Sept. 11, 1951 |
| 2,580,421 | Guanella | Jan. 1, 1952 |
| 2,677,721 | Bedford | May 4, 1954 |
| 2,757,227 | Houghton | July 31, 1956 |
| 2,784,255 | Earp | May 5, 1957 |
| 2,845,613 | Pawley | July 29, 1958 |